US008547606B2

(12) United States Patent
Matsuo

(10) Patent No.: US 8,547,606 B2
(45) Date of Patent: Oct. 1, 2013

(54) OPTICAL SCANNING APPARATUS PROVIDED WITH RESONANCE-DRIVEN SWING MIRROR AND IMAGE FORMING APPARATUS

(75) Inventor: Shimpei Matsuo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 311 days.

(21) Appl. No.: 13/149,200

(22) Filed: May 31, 2011

(65) Prior Publication Data

US 2011/0317228 A1 Dec. 29, 2011

(30) Foreign Application Priority Data

Jun. 24, 2010 (JP) ................................. 2010-143918

(51) Int. Cl.
*H04N 1/04* (2006.01)
(52) U.S. Cl.
USPC ............ 358/481; 358/482; 358/474; 358/475
(58) Field of Classification Search
USPC .................................. 358/481, 482, 474, 475
See application file for complete search history.

(56) References Cited

U.S. PATENT DOCUMENTS

| 4,742,363 | A | * | 5/1988 | Shiraishi ........................ 347/253 |
| 5,373,518 | A | | 12/1994 | Uchiyama et al. ............... 372/38 |
| 5,463,410 | A | | 10/1995 | Uchiyama et al. ............. 347/133 |
| 5,943,082 | A | | 8/1999 | Uchiyama et al. ............. 347/156 |
| 6,222,580 | B1 | * | 4/2001 | Yamada ........................ 347/247 |
| 2009/0051992 | A1 | | 2/2009 | Fujii et al. ..................... 359/199 |

FOREIGN PATENT DOCUMENTS

| JP | 2005-292627 | 10/2005 |
| JP | 2005-326462 | 11/2005 |

* cited by examiner

*Primary Examiner* — Houshang Safaipour
(74) *Attorney, Agent, or Firm* — Fitzpatrick, Cella, Harper & Scinto

(57) ABSTRACT

An optical scanning apparatus capable of suppressing a track error is provided. The apparatus includes a swing mirror supported by a torsional vibration system having a first natural frequency and a second natural frequency that is a double of the first natural frequency, and a driving unit applying a swing torque to the vibration system. The apparatus can detect passage of an optical beam at two locations and output track information of the swing mirror, and perform feedback control. When the feedback control is performed, the apparatus sequentially switches target tracks of scanning in a forward and a backward direction, the phases of the second natural frequency of the target tracks being mutually reversed, calculates an amount of offset compensation based on a difference between the predetermined target track and the track for each scanning in the forward and backward direction, and reflects the amount in the feedback control.

7 Claims, 10 Drawing Sheets

F I G. 5
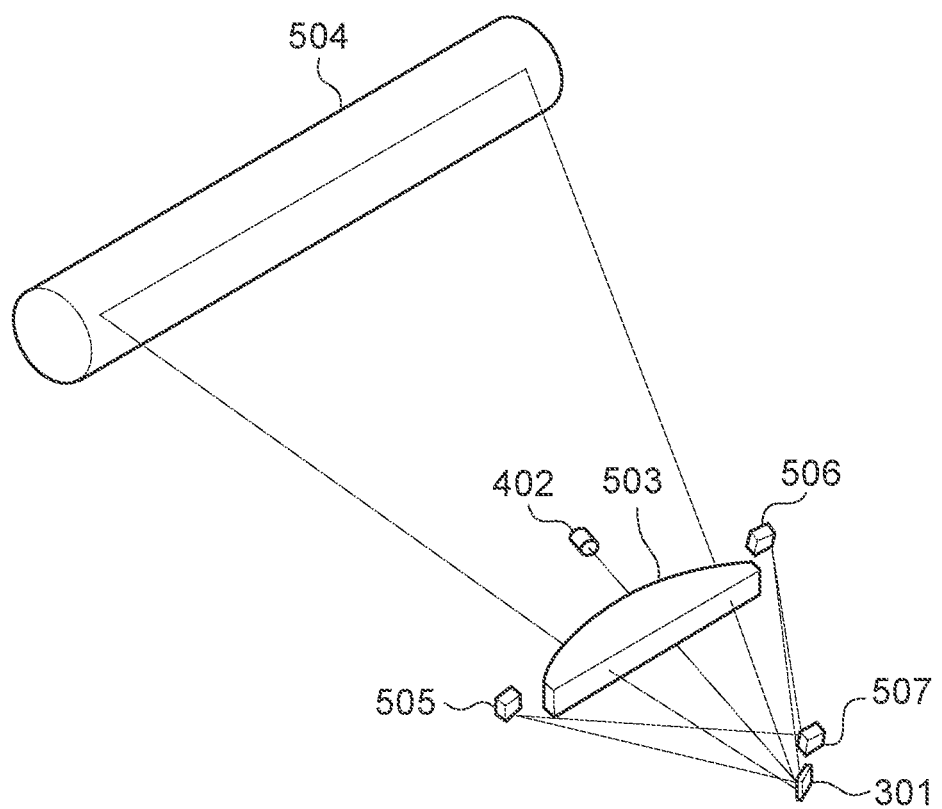

OPTICAL SCANNING APPARATUS PROVIDED WITH RESONANCE-DRIVEN SWING MIRROR AND IMAGE FORMING APPARATUS

BACKGROUND OF THE INVENTION

1. Field of the Invention

The present invention relates to a technique for high-accuracy driving of a swing oscillation element in an optical scanning apparatus and an image forming apparatus.

2. Description of the Related Art

Conventionally, various optical deflection apparatuses have been proposed where a mirror is resonance-driven. For example, Japanese Patent Laid-Open No. 2005-292627 discloses a resonant type optical deflection apparatus based on a single resonance frequency. The resonant type optical deflection apparatus based on a single resonance frequency has a problem in that the scanning angle of the mirror varies in a sine wave form in principle, resulting in a problem in that the angular velocity is not constant. In order to solve this, Japanese Patent Laid-Open No. 2005-326462 proposes a resonant type optical deflection apparatus based on an approximately-constant angular velocity. With the resonant type optical deflection apparatus disclosed in Japanese Patent Laid-Open No. 2005-326462, it is possible to generate a swing wave having a saw-tooth waveform.

FIG. 10 is an example block diagram illustrating the configuration of a control system for performing track control of an approximately-constant velocity resonant type optical deflection apparatus that has, as its natural frequencies, a fundamental frequency and a second harmonic thereof. A scanner block 101 of the approximately-constant velocity resonant type optical deflection apparatus is driven as described below. First, in accordance with a sequence control by a CPU 102, an NCO (numerically controlled oscillator) 201 generates a driving wave of the resonant type optical deflection apparatus. The driving wave output from the NCO 201 is subjected to PWM with a PWM modulator 104, and an H-bridge 105 is switched by the output from the PWM modulator 104, thereby performing linear modulation. The output from the H-bridge 105 drives the scanner block 101 of the resonant type optical deflection apparatus. The scanner block 101 has two oscillation modes, namely, a fundamental frequency and a second harmonic thereof. Therefore, the track with an approximately-constant angular velocity is defined by establishing the track equation stated below, the equation having four independent variables as coefficients, which are a combination of the vector of the fundamental frequency (amplitude A1 and phase Φ1) and the vector of the second harmonic (amplitude A2 and phase Φ2).

$$\theta = A1\sin(\omega t + \Phi 1) + A2\sin(2\omega t + \Phi 2) \qquad \text{Equation (1)}$$

Four control loops composed of four-dimensional orthogonal component data are converged independent of each other in a linear control system that achieves the track defined by the above track equation, since the linear system is required to be mathematically holomorphic. The feedback loop shown in FIG. 10 starts from optical beam detection sensors 405 and 406, passes detected beam phases 1106/target beam phases 1107, a comparator 110, a conversion matrix 111, a PID system 114, and a feedback gain 115 in this order, and reaches the NCO 201. Here, the detected beam phases 1106 are indicated by counters P1, P2, P3, P4, and the target beam phases 1107 are indicated by P10; P20; P30; P40. This feedback loop is composed of a vector that includes four independent variables as its components. The optical beam detection sensors 405 and 406 are disposed in positions in a non-image region, the positions being substantially symmetrically with respect to, and located on the left and right sides of a center of swing. The optical beam detection sensors 405 and 406 each detect scanning track information that is component-displayed by four detected beam phases, P1, P2, P3, P4, of an optical beam that is deflected by a swing mirror 301 and travels back and forth.

The comparator 110 subtracts, from the detected beam phases 1106, the target beam phases 1107 of four points at the optical beam detection positions, the phases having been obtained in advance with the track equation, and outputs a beam phase difference vector. The beam phase difference vector is subjected to coordinate conversion by the conversion matrix 111 into difference control parameters composed of an amplitude component and a phase component, and the difference control parameters are input to a classical control theory PI control unit (PID system 114). Then, feedback amounts, ΔA1; ΔA2; Δφ1; Δφ2, obtained by multiplying the input difference control parameters by a feedback gain 115 are reflected in the control parameters of the track equation, thereby forming a feedback control unit. Here, a conversion matrix $M^{-1}$ is obtained by performing partial differentiation on a target track equation with respect to each of eight components, namely, four orthogonal vector components of an input vector X and those of an output vector Y, solving a differential coefficient ratio of each output component to the corresponding input component, and generating a matrix. The matrix is a linear conversion matrix, and also a coefficient matrix for performing coordinate conversion from a space in the vector X into a space in the vector Y by a linear conversion operation, and thus the relevant equation needs to be a linear function in order to obtain an exact solution. However, the sine function in the track equation is a non-linear function involving infinite orders and is a composite function thereof, and thus it is impossible to directly solve an inverse function. Therefore, in order to calculate the conversion matrix $M^{-1}$, a target track equation is subjected to Taylor expansion with respect to an optical beam detection point, so as to convert the equation into a linear approximate equation. At the same time, by taking the input vector X as a control parameter and the output vector Y as a beam phase, a conversion coefficient ratio matrix from the vector X to the vector Y is calculated once. Then, an inverse matrix thereof is obtained. In this manner, the conversion matrix $M^{-1}$ is calculated in two steps. The concept of these two steps is described with the equations stated below.

$$\Delta Y = [M]\Delta X = \qquad \text{Equation (2)}$$
$$\left[\frac{\partial \Theta}{\partial X}\bigg|_{\phi=Pn0}\right]\Delta X \xrightarrow{\text{INVERSE FUNCTION}} [M]^{-1}\Delta Y$$

$$\Delta Y = \begin{pmatrix} \Delta P1 \\ \Delta P2 \\ \Delta P3 \\ \Delta P4 \end{pmatrix} = \begin{pmatrix} P1 - P10 \\ P2 - P20 \\ P3 - P30 \\ P4 - P40 \end{pmatrix} \qquad \text{Equation (3)}$$

$$\Delta X = \begin{pmatrix} \Delta A1 \\ \Delta A2 \\ \Delta \phi 1 \\ \Delta \phi 2 \end{pmatrix} = \begin{pmatrix} A1 - A10 \\ A2 - A20 \\ \phi 1 - \phi 10 \\ \phi 2 - \phi 20 \end{pmatrix}$$

Here, Pn0 indicates a design target phase at a BD detection position.

Since the conversion matrix $M^{-1}$ obtained by the above operation is a linear approximation, occurrence of an error is more likely as the distance from the expansion point increases. However, if a target beam phase that is determined depending on a design value of the optical beam detection position is used as the convergence point, in the vicinity thereof, the conversion matrix $M^{-1}$ shows sufficient accuracy for practical use and thus can be used. With the configuration of the control system described above, the scanning track information composed of the four phase components P1; P2; P3; P4 detected by the optical beam detection sensors 405 and 406 are compared with a target track represented by the phase components P10; P20; P30; P40. Error information is converted with the conversion matrix $M^{-1}$ into four control parameters composed of amplitude components and phase components, namely, $\Delta A1$; $\Delta A2$; $\Delta \phi 1$; $\Delta \phi 2$, which can be input to the feedback control unit, thereby realizing feedback control in a vector quantity. In this manner, a track control method for an approximately constant velocity resonant type optical deflection unit having a second harmonic as its natural frequency is proposed, in which the track is converged into a target track having four parameters.

However, in the track control of a resonant type optical deflection apparatus that has a second harmonic as its natural frequency, an offset may occur, the offset being a deviation amount in the scanning angle between a reference detection position of the optical beam detection sensor and a center of swing of the optical deflection apparatus. That is, there is a problem that if track control is performed assuming that the offset amount is zero, an offset appears as a phase control error of the second harmonic. The track equation including an offset amount is as described below. Note that the offset amount will be described in an embodiment described later with reference to FIG. 4.

$$\theta = A1 \sin(\omega t + \Phi 1) + A2 \sin(2\omega t + \Phi 2) + \text{Offset} \qquad \text{Equation (4)}$$

That is, since the track equation is based on a sine function, in principle, the gain of the variation of the detection timing in the phase direction with respect to the variation in the amplitude direction, that is, the detection position angle, is at least one, and the gain increases as the distance to the peak decreases. Since the detection position of the optical beam detection sensor is set avoiding an image rendering region, the detection position is set on the side close to the peak of the scanning track, and thus the gain increases. Then, with respect to the second harmonic component, the detection phase is varied in the same direction as the variation of the amplitude, due to its phase relation with the fundamental frequency, and the amplitude is smaller than that of the fundamental frequency. Thus, the gain with respect to the phase deviation of the second harmonic component becomes higher.

FIG. 11 shows track velocity error due to an offset, and shows track error due to a phase deviation of a second harmonic that has occurred as a result of performing control with an offset of $1/(60)°$ as a graph. In the graph, the horizontal axis indicates the scanning angle and the vertical axis indicates the scanning speed. A waveform 1301 is a scanning speed waveform of the track affected by a phase deviation of the second harmonic, and the range between waveforms 1302 and 1303 is the acceptable range of a normal scanning speed waveform. In this manner, control error due to an offset error is conspicuously reflected, and a phase deviation of the second harmonic distorts the approximately-constant velocity track, and therefore, a scanning error due to the distortion occurs. Because of the reason described above, there is a problem that even a small offset amount causes a phase deviation of the second harmonic, and results in a very conspicuous scanning error as shown in FIG. 11, such that the image is distorted. Also, since the track deviates from the convergence point for the target track, a sufficient feedback gain cannot be applied, and jitter increases. However, in the case where a linear control system is designed in which an offset item is added to the target track equation and offset compensation is performed based on five-variance control, it is necessary to increase the number of phase components detected by the optical beam detection sensor from four to five. Therefore, it is necessary to add one more detection position, which is not preferable in terms of cost.

SUMMARY OF THE INVENTION

The present invention provides an optical scanning apparatus capable of suppressing cost and track control error due to an offset related to a center of swing of a resonant type optical deflection apparatus, and an image forming apparatus including such an optical scanning apparatus.

According to one aspect of the present invention, there is provided an optical scanning apparatus comprising: an optical scanning unit including a swing mirror deflecting an optical beam and driving unit, the swing mirror being supported by a torsional vibration system having a first natural frequency and a second natural frequency that is a double of the first natural frequency, and the driving unit being configured to apply a swing torque having the first natural frequency and the second natural frequency to the torsional vibration system; an optical beam detection unit configured to detect passage of an optical beam deflected by the swing mirror at two locations in a non-image region, and output track information indicating a track of the swing mirror; a track control unit configured to, based on a difference between the track indicated by the track information detected by the optical beam detection unit and a predetermined target track, adjust the swing torque such that the track of the swing mirror approaches the target track, thereby performing feedback control; a calculation unit configured to sequentially switch target tracks of scanning in a forward direction and a backward direction, the phases of the second natural frequency of the target tracks being mutually reversed, perform the feedback control by the track control unit for each scanning in the forward direction and the backward direction, and calculate an amount of offset compensation based on the difference between the predetermined target track and the track detected by the optical beam detection unit for each scanning in the forward direction and the backward direction; and an offset compensation unit configured to reflect the amount of offset compensation in the feedback control.

Further features of the present invention will be apparent from the following description of exemplary embodiments with reference to the attached drawings.

BRIEF DESCRIPTION OF THE DRAWINGS

FIG. 5 is a configuration diagram when the scanner block of the embodiment is applied to an image forming apparatus;

DESCRIPTION OF THE EMBODIMENTS

Figure 1:
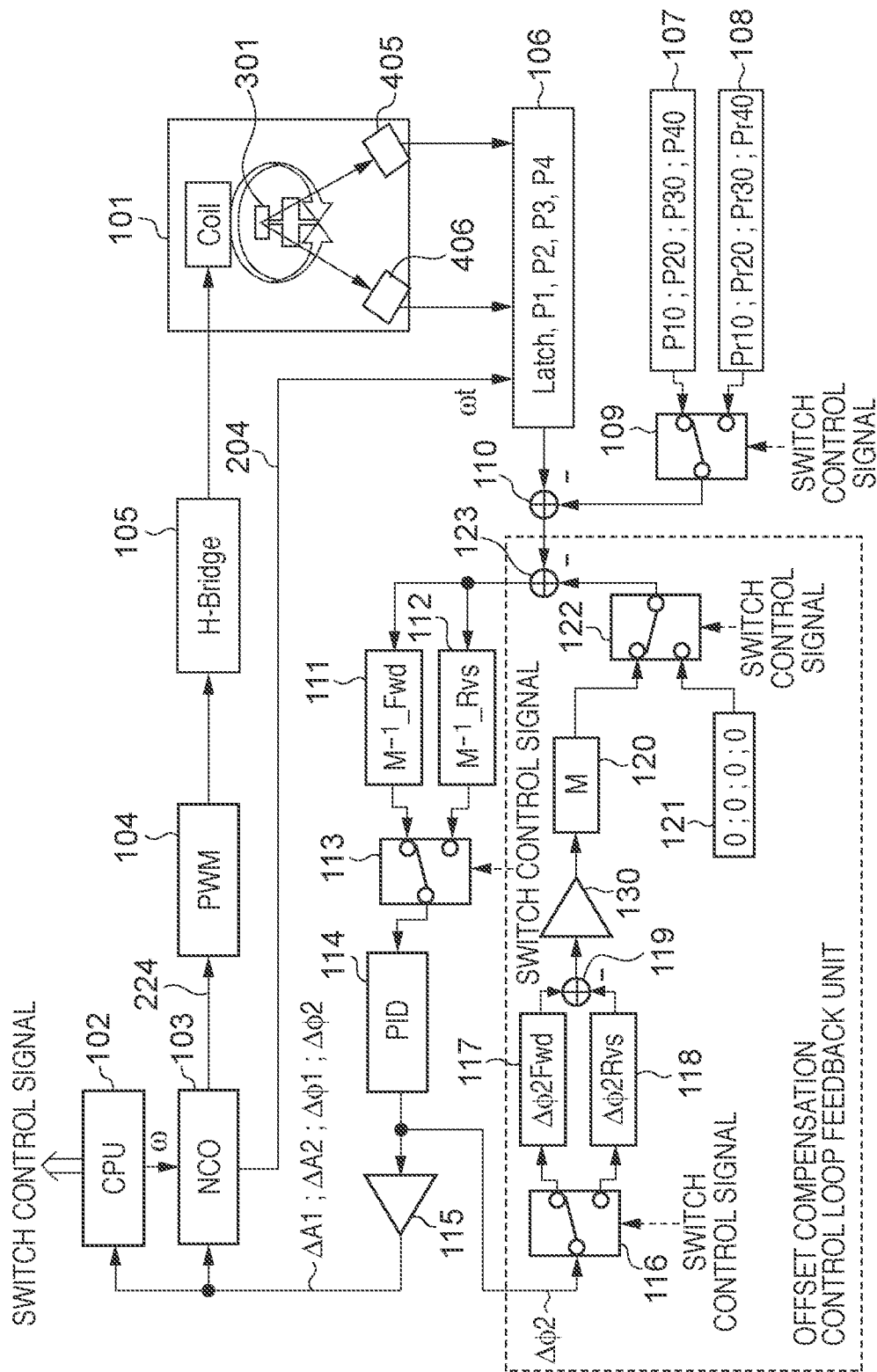
FIG. 1 is a block diagram showing the configuration of a control system of an optical scanning apparatus according to an embodiment of the present invention.

Hereinafter, a mechanism that realizes offset detection in which an offset value that causes an error in track control is read with a high accuracy without making any particular expensive innovation in an optical beam detection system. An extracted offset value is compensated with a high accuracy by a simple configuration. Specifically, track information that is lacking for extracting offset information from optical beam detection information with a matrix is supplemented by changing a drive parameter, thereby enabling extraction of such offset information. That is, a target track phase component is parameterized with respect to a phase component that has crosstalk with respect to an offset from the nature of the function of the track equation. Then, an offset value is calculated based on a phase difference component obtained from control results of two tracks. By this method, it is made possible to detect a phase component due to an offset caused by geometric characteristics of a scanner that are affected by a change in the track, separate from a phase component caused by a temporal factor.

<Configuration Example of Control System of Optical Scanning Apparatus of Present Embodiment>

A control system of the present embodiment shown in FIG. 1 includes elements described below. Reference numeral 101 denotes a scanner block, which includes a resonant type deflection apparatus described with reference to FIG. 3 below and an optical beam detection system described in FIG. 4. The deflection apparatus in FIG. 3 performs approximately-constant velocity waveform scanning described with reference to FIGS. 6A and 6B based on the track control, and an optical beam deflected by the deflection apparatus is irradiated onto a photosensitive drum by an optical system described with reference to FIG. 5. Reference numeral 102 denotes a CPU, which governs the sequence control described with reference to the flowchart of FIG. 8. Reference numeral 103 denotes a numerically controlled oscillator (NCO), which generates a driving wave and a driving cycle of the optical scanning apparatus with the configuration illustrated in FIG. 2. Reference numeral 104 denotes a pulse wide modulation (PWM) modulator, which performs PWM on the driving wave output from the NCO 103. A signal obtained by the PWM is used for switching an H-Bridge 105 and performing linear modulation. Reference numeral 106 denotes a latch, which latches a phase count value $\omega t$ 204 of the NCO 103 according to an optical beam passage detection signal so as to obtain the phase count value $\omega t$ 204 as phase information, and outputs four optical beam phases described with reference to reference numerals 608 to 611 in FIG. 6.

An unshown storage unit stores forward scanning target beam phases 107 (forward scanning target track) and backward scanning target beam phases 108 (backward target track). Here, the forward scanning target beam phases 107 are represented by P10; P20; P30; P40, and the backward scanning target beam phases 108 are represented by Pr10; Pr20; Pr30; Pr40. A comparator 110 subtracts, from the optical beam phases P1, P2, P3, P4 latched by the latch 106, target beam phases of either forward direction or backward direction selected by a selector 109. The comparator 110 outputs error information with respect to the target beam phase obtained by the subtraction. Reference numeral 111 denotes a forward scanning conversion matrix $M^{-1}$_Fwd, and reference numeral 112 denotes a backward scanning conversion matrix $M^{-1}$_Rev. Details of these conversion matrixes are as described with $\Delta X = [M]^{-1} \Delta Y$ in Equation (2), and will not be described again here. These conversion matrixes calculate $\Delta A1; \Delta A2; \Delta \Phi 1; \Delta \Phi 2$, which are difference parameters ($\Delta X$) of drive amplitudes and phases, by product-sum operation based on error information ($\Delta Y$) of actually detected beam phases with respect to the target beam phases. A selector 113 selects the forward scanning conversion matrix $M^{-1}$_Fwd if the set track corresponds to forward scanning, and selects the backward scanning conversion matrix $M^{-1}$_Rev if the set track corresponds to backward scanning. The difference parameters of drive amplitudes and phases, which are results (output) of calculation made with the conversion matrix selected by the selector 113, are input to a PID system 114. In the PID system 114, the difference parameters are tuned according to a known classical control theory, and a feedback gain is applied thereto in a feedback gain unit 115, thereby generating a vector having the four variables $\Delta A1; \Delta A2; \Delta \Phi 1;$ and $\Delta \Phi 2$, that is input to the NCO 103. Also, due to the gain-frequency (phase) characteristics of the PID system 114, sudden noises can be eliminated. In this manner, a track feedback control loop is formed that includes the selectors 109 and 113 for switching forward and backward tracks.

Reference numerals 116 to 123 denote elements that make up an offset compensation control loop feedback unit. A selector 116 inputs $\Delta \Phi 2$ (phase variation amount (deviation from an ideal value)) to either a forward scanning phase register 117 ($\Delta \phi 2$_Fwd) or a backward scanning phase register 118 ($\Delta \phi 2$_Rev), depending on whether the set track corresponds to forward scanning or backward scanning, at a timing designated by the CPU 102. Then, the forward scanning phase register 117 ($\Delta \phi 2$_Fwd) and the backward scanning phase register 118 ($\Delta \phi 2$_Rev) each hold the value of $\Delta \Phi 2$ input thereto. A comparator 119 compares the values of $\Delta \Phi 2$ stored in the forward scanning phase register 117 and the backward scanning phase register 118, and calculates a difference value therebetween. Then, the comparison result is output to a gain adjuster 130. The gain adjuster 130 multiplies the input signal representing the offset amount (double of $\Delta \phi_d 2$) by a predetermined coefficient (e.g., 1/10), and sends the signal obtained by the multiplication to a beam phase conversion matrix 120. This signal obtained by the multiplication corresponds to an offset compensation amount. Note that specific operations of the gain adjuster 130 will be described in detail with reference to step S812 in the flowchart of FIG. 8 described later. The beam phase conversion matrix (M) 120 converts an input offset compensation amount to a beam phase compensation amount. Here, the beam phase compensation amount refers to a compensation amount obtained by converting the offset compensation amount into a scanning cycle phase. The beam phase conversion matrix 120 is as already described with Equation (2). $\Delta X; \Delta X^T = (0, 0, 0, 2\Delta \phi 2)$ is taken as an input vector, the input vector is multiplied by the matrix, and $\Delta Y; \Delta Y^T = (\Delta P1, \Delta P2, \Delta P3, \Delta P4)$ is output. Then, this ($\Delta P1, \Delta P2, \Delta P3, \Delta P4$) obtained by the operation is decoded and reflected in the track feedback control loop shown in FIG. 1. Accordingly, (P10; P20; P30; P40) of the forward scanning target beam phase 107 are converted into offset compensation target beam phases (P10'; P20'; P30'; P40'). The offset compensation target beam phases are new target phases that are obtained by compensating target beam phases obtained by converting a design beam detection position into a scanning cycle phase with a beam phase compensation amount. Note that the offset compensation amount from the beam phase conversion matrix 120 to the track feedback control loop is updated before starting each print operation, for example, and is not updated during printing or the like. Of course, when a large number of sheets are printed, printing may be interrupted to update the offset compensation amount. A selector 122 selects a zero phase vector (0; 0; 0; 0) 121 when an offset is detected. Also, the selector 122 selects a beam phase compensation amount obtained as a result of the conversion by the beam phase conversion matrix 120 when offset compensation control is performed. The signal selected by the selector 122 is subtracted from an actually detected beam phase with a beam phase compensator 123. "Subtraction" here refers to, as described before, an operation of converting $\Delta\phi2$ correlated with the offset amount into a beam phase, further decoding the conversion result, reflecting the decoded conversion result in the track feedback control loop, thereby indirectly canceling $\Delta\phi2$.

(Configuration Example of NCO 103)

Figure 2:
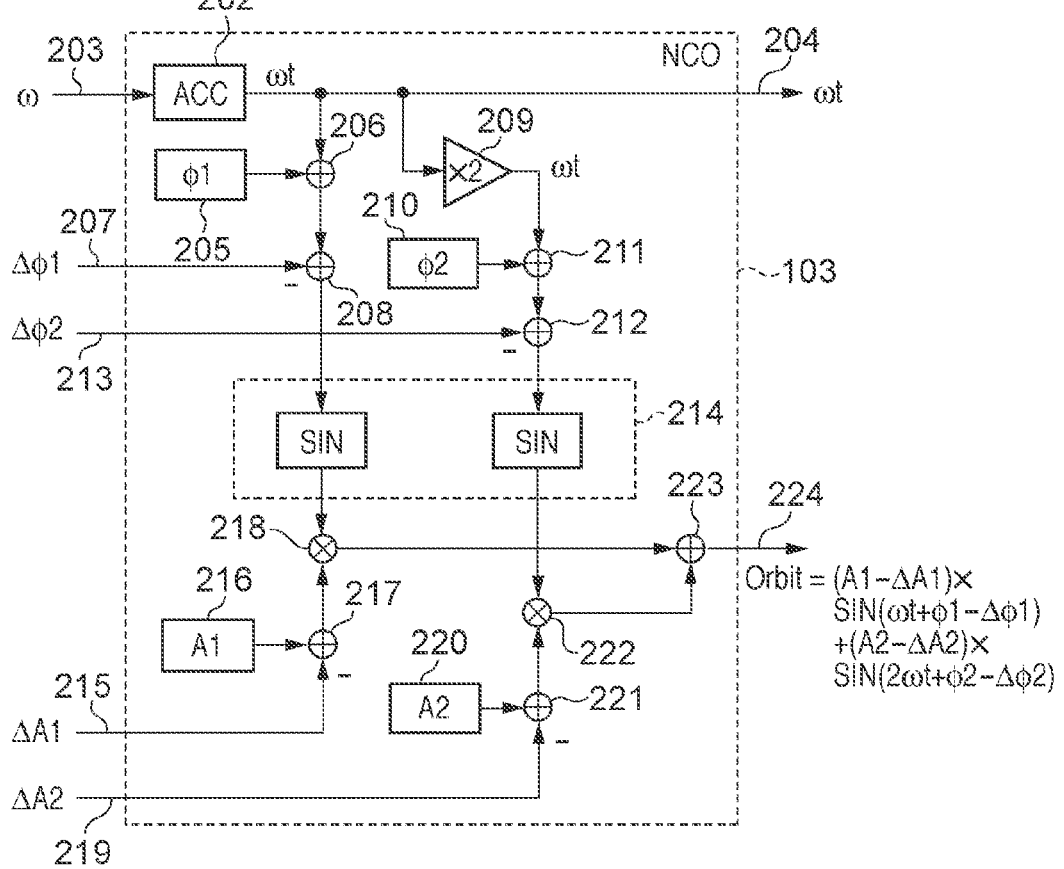
FIG. 2 is a block diagram of a numerically controlled oscillator (NCO) of the embodiment.

The NCO 103 shown in FIG. 2 is configured from a logic circuit. An accumulation counter (ACC) 202 accumulates, at every clock, a constant corresponding to an angular frequency setting value $\omega$203 that has been input, while setting one cycle as a maximum count. In this manner, a phase counter in a saw-tooth waveform is formed, and the phase count value $\omega t$ 204 of a fundamental frequency is output as a driving cycle.

In an initial value register 205, a initial phase value $\phi 1$ determined by a system transfer function has been set. Reference numeral 207 denotes an input $\Delta\phi 1$ from the feedback gain unit 115. With an adder 206 and an adder 208, $\phi 1$ and $\Delta\phi 1$ are added to the phase of the fundamental frequency. A multiplier 209 doubles the phase count value $\omega t$ 204 of the fundamental frequency, and generates the phase of a second harmonic. A initial phase value $\phi 2$ is set in an initial value register 210. Reference numeral 213 denotes an input $\Delta\phi 2$ from the feedback gain unit 115. With an adder 211 and an adder 212, $\phi 2$ and $\Delta\phi 2$ are added to the phase of the second harmonic. Reference numeral 214 denotes a sine table (SIN), which is normally expanded and loaded from a ¼ cycle sine function ROM according to a phase input, and outputs a sine function amplitude. Reference numeral 215 denotes an input $\Delta A1$ from the feedback gain unit 115. A register 216 holds an initial value A1 of the amplitude. An adder 217 inputs a difference between A1 and $\Delta A1$ to a multiplier 218. Similarly, reference numeral 219 denotes an input $\Delta A2$ from the feedback gain unit 115. A register 220 holds an initial value A2 of the amplitude. An adder 221 inputs a difference between A2 and $\Delta A2$ to a multiplier 222. The multiplier 218 multiplies the fundamental frequency by the output from the adder 217, and the multiplier 222 multiplies the second harmonic by the output from the adder 221. Then, an adder 223 calculates a composite wave $(A1-\Delta A1)\times SIN(\omega t+\Phi 1-\Delta\Phi 1)+(A2-\Delta A2)\times SIN(2\omega t+\Phi 2-\Delta\Phi 2)$, and outputs the result to the PWM modulator 104 as a driving wave output 224 that has been adjusted so as to have a smallest track error.

Note that in FIGS. 1 and 2 of the present embodiment, PWM is performed by using an applied voltage wave as a driving wave output. However, as another embodiment, square wave modulation may be performed as long as it is linear modulation. Of course, an analog driver may be used, or an applied current wave may be used as a driving wave output. In short, any driver may be used as long as it is a macro linear driver.

<Configuration Example of Scanner Block of Present Embodiment>

Figure 3:
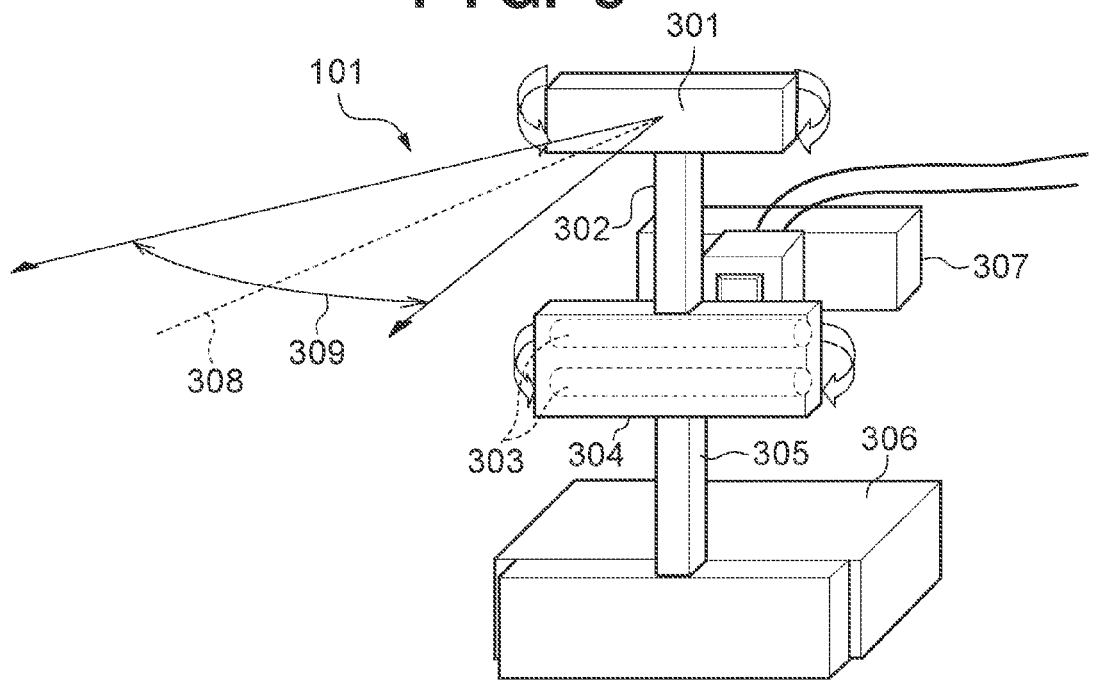
FIG. 3 is a diagram of a resonant type deflection apparatus of a scanner block of the optical scanning apparatus of the embodiment.

In a resonant type deflection apparatus of a scanner block of the present embodiment shown in FIG. 3, a swing mirror 301 is supported on a driving element 304 by a torsion spring 302. Magnets 303 are magnetized in a longitudinal direction, and fixed to the driving element 304. A torsion spring 305 supports the driving element 304 on a support unit 306. The swing mirror 301, the torsion spring 302, the driving element 304 and the torsion spring 305 are formed as a single body with single crystal silicon. A pair of the driving element 304 and the torsion spring 305 has a natural frequency equal to the fundamental frequency (first harmonic). Also, a pair of the swing mirror 301 and the torsion spring 302 has a natural frequency equal to a second harmonic of the fundamental frequency. The entire resonant type deflection apparatus constitutes a two-degree-of-freedom torsional vibration system. An exciting coil unit 307 applies swing torque by supplying an exciting coil with a current having the driving cycle and the phase corresponding to the natural frequency, and scans a scan range 309 with a scanning beam, centered on a center of swing 308. Of course, it is not always necessary to use an exciting coil, and a configuration may be adopted as another embodiment in which a piezoelectric element is disposed on a support unit.

(Definition of Offset of Present Embodiment)

Figure 4:
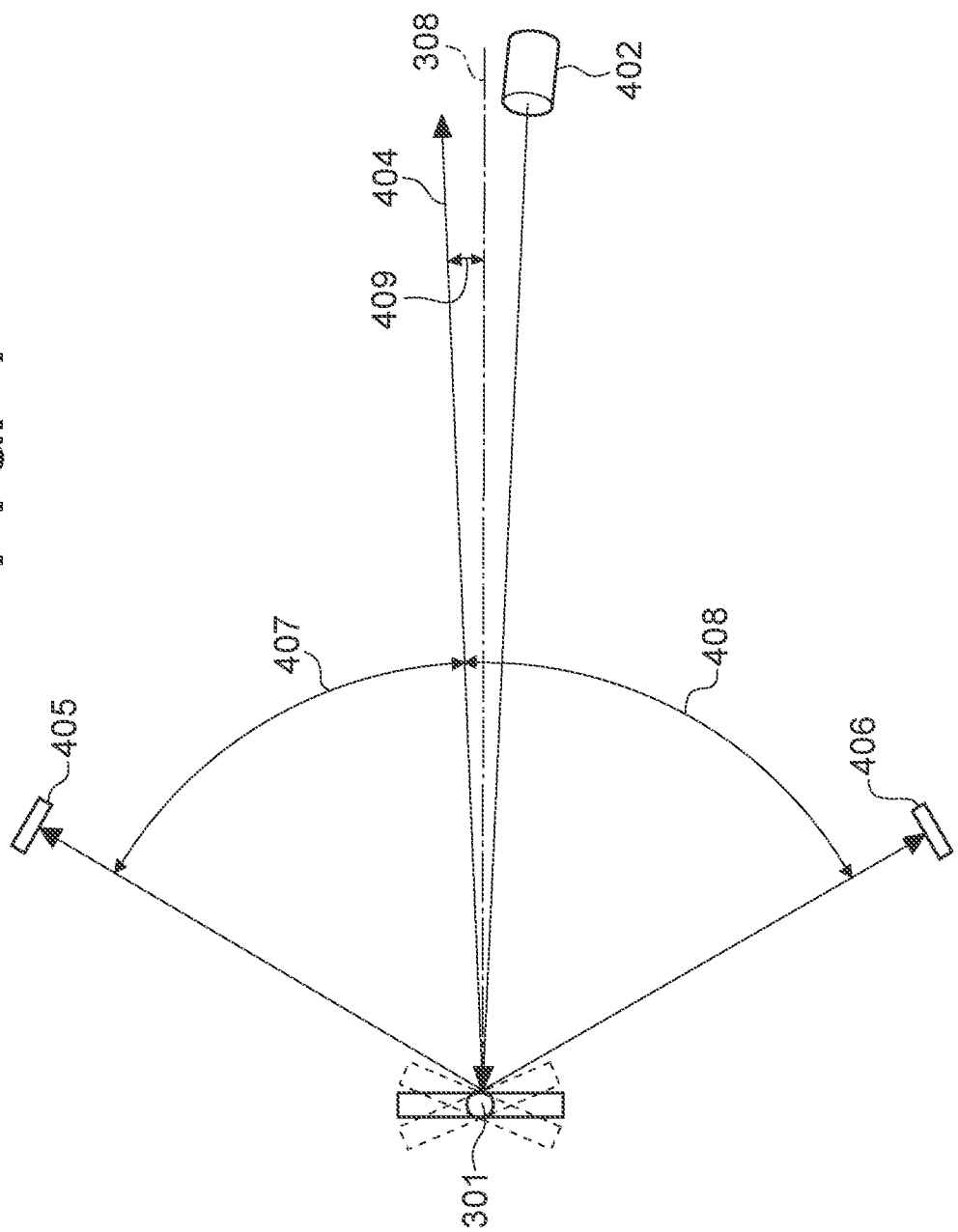
FIG. 4 is a diagram illustrating beam detection and offset of the scanner block of the optical scanning apparatus of the embodiment.

FIG. 4 is a diagram illustrating beam detection and offset of the scanner block of the present embodiment, and the definition of the offset is described below. The swing mirror 301 performs scanning with an optical beam from a laser beam light source 402. Reference numeral 308 denotes the center of swing of the swing mirror 301 in design (the ideal center of swing). The center of swing 308 also serves as an optical beam detection reference position. Reference numeral 404 denotes a virtual optical beam detection reference position that is determined depending on the actual positions of optical beam detection sensors 405 and 406, that is, the position defined in accordance with the actually detected track of the optical beam. The virtual optical beam detection reference position is determined according to the internally dividing point based on the ratio between the design values of a setting angle 407 of the position of the optical beam detection sensor 405 and a setting angle 408 of the position of the optical beam detection sensor 406. Since the ratio is set to 1:1 in the present embodiment, the virtual optical beam detection reference position is set to the middle point between the mount position of the optical beam detection sensor 405 (BD1) and the mount position of the optical beam detection sensor 406 (BD2). A deviation amount of the virtual optical beam detection reference position 404 relative to the optical beam detection reference position 308 in design is an offset 409. In this manner, by performing offset control such that the middle point between the optical beam detection positions matches the center of swing, a residual positional error among these three points is absorbed by image magnification which allows a relatively larger error in preciseness so that an offset that may cause distortion is theoretically made zero. Of course, as another embodiment, the virtual optical beam detection reference position 404 does not necessarily need to be the symmetry center position, and it is sufficient if it is an internally dividing point based on the ratio between design values.

<Three-Dimensional Configuration of Scanner Block of Image Forming Apparatus of Present Embodiment>

FIG. 5 is a diagram in which the scanner block of the present embodiment is applied to an image forming apparatus. The swing mirror 301 performs scanning at an approximately constant velocity with an optical beam from the laser beam light source 402 that is incident from above at an angle to the center of swing, and a fθ lens 503 performs fθ correction and residual distortion correction, and performs scanning on a photosensitive drum 504 of the image forming apparatus, thereby performing latent image exposure. BD mirrors 505 and 506 are disposed at two locations in the non-image region, which are end portions outside the scanning region of the photosensitive drum 504. The reflection light from the BD mirrors 505 and 506 is incident on an optical beam detection sensor 507 formed by a photodiode. The optical beam detection positions are disposed substantially symmetrically, and also difference in response characteristics between right and left sides is eliminated. Of course, as another embodiment, two each of the optical beam detection sensors 405 and 406 may be used. Note that although not shown in FIG. 5, toner from a developer adheres to a latent image formed on the photosensitive drum, and a toner image is visualized. The visualized toner image is primary-transferred to an image carrier such as an intermediary transfer belt in a primary transfer unit, secondary-transferred to a recording sheet in a secondary transfer unit, and then fixed with a fixing apparatus. Known image formation is performed in this manner.

<Operation of Offset Compensation of Present Embodiment>

(Relation Between Target Beam Phase and Track, and Beam Detection Position)

Figure 6A:
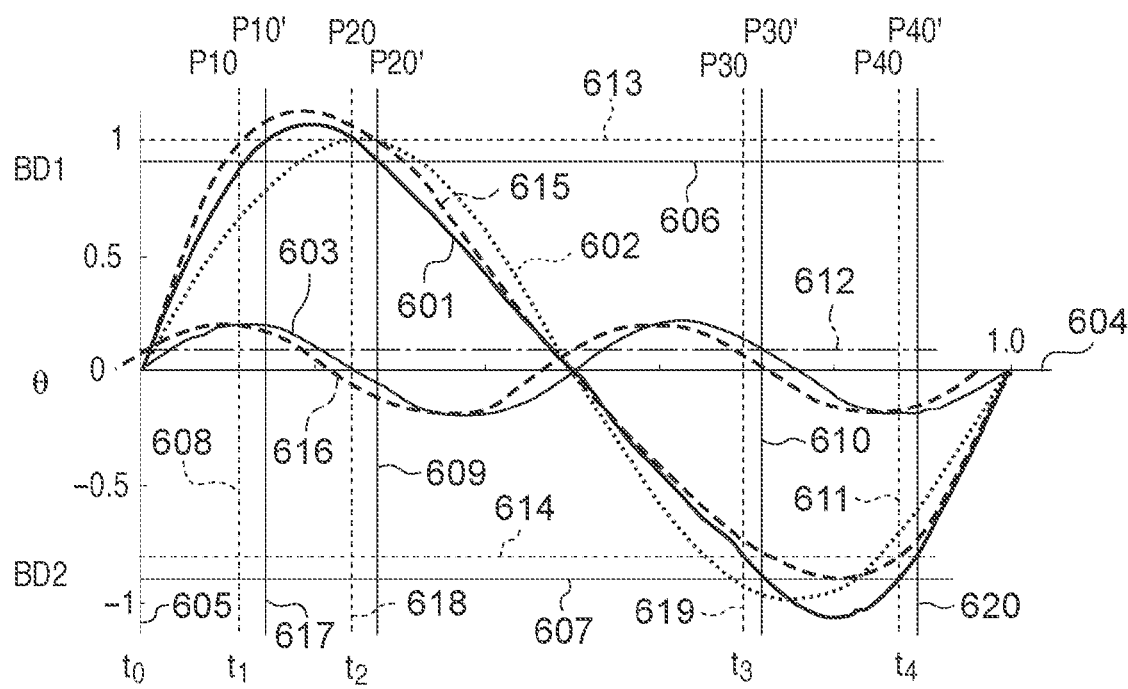
FIGS. 6A and 6B are diagrams illustrating the relation between target beam phases and a track with beam detection positions in an offset compensation operation of the embodiment, with respect to a forward scanning direction and a backward scanning direction, respectively.
Figure 6B:
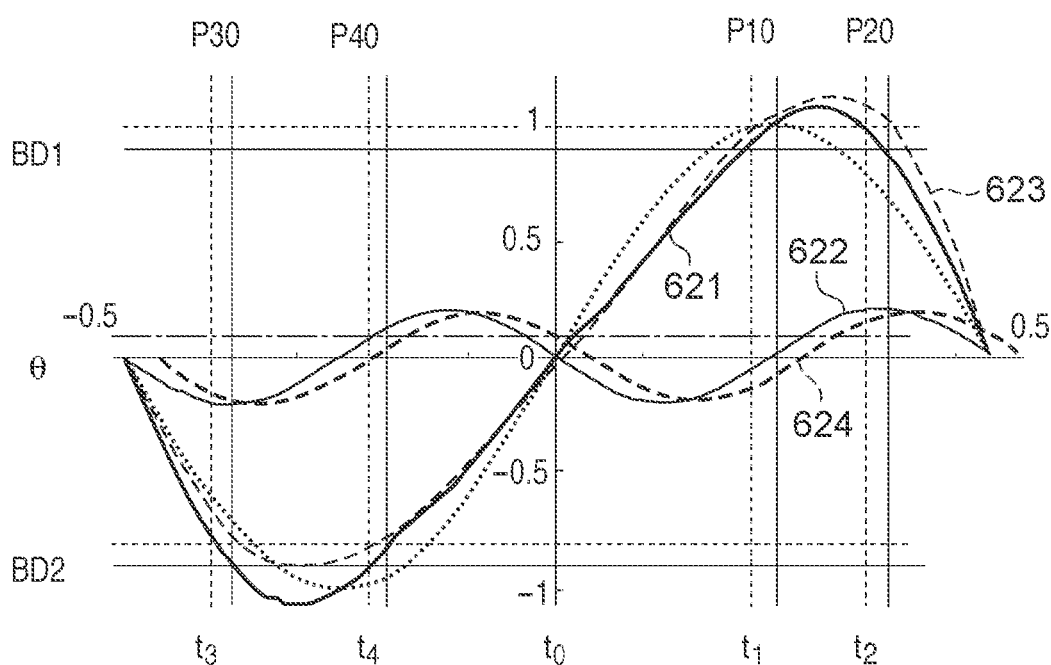

FIGS. 6A and 6B are diagrams illustrating an offset compensation operation of the present embodiment based on the relation between target beam phases and track, and beam detection positions. The principle of track compensation will be described below. First, the vertical axis in FIG. 6A indicates the beam scanning angle. The unit is normalized by setting the amplitude of a first harmonic component of the target track to 1. The horizontal axis indicates the scanning cycle phase. A waveform 601 in FIG. 6A is a forward scanning target track defined by the track equation, $\theta = A1 \times SIN(\omega t + \Phi 1) + A2 \times SIN(2\omega t + \Phi 2)$. A waveform 602 corresponds to a fundamental frequency, and is the waveform of the fundamental frequency component of the track equation, namely, $A1 \times SIN(\omega t)$. Waveform 603 corresponds to a second harmonic, and is the waveform of the second harmonic component of the track equation, namely, $A2 \times SIN(2\omega t)$. A line 604 indicates the center of swing in design. A line 605 is a line indicating time t0, which serves as a reference phase of the track equation. Lines 606 and 607 respectively indicate the positions of the optical beam detection sensor 405 and the optical beam detection sensor 406, which are the beam detection positions in design for track control. Note that a reflection mirror may be provided in a position where the optical beam detection sensor 405 is disposed, such that the optical beam reflected by the reflection mirror is received by the optical beam detection sensor 406. In this manner, the number of the optical beam detection sensors can be reduced. Lines 608 to 611 each indicate the target beam phases 107 (P10; P20; P30; P40) that have been calculated with the track equation based on the beam detection positions in design. A waveform 615 indicates a control track affected by an offset, and indicates the track when the target beam phases are controlled without performing offset compensation. A waveform 616 indicates a second harmonic affected by an offset, indicates the waveform of the second harmonic component when the target beam phases are controlled without performing offset compensation, and shows a phase deviation due to an offset. Lines 617 to 620 each indicate offset compensation target beam phases (P10'; P20'; P30'; P40'). A line 612 indicates the virtual optical beam detection reference position, and represents an offset amount defined according to the internally dividing point based on the ratio between the design values of the line 613 indicating the position of the optical beam detection sensor 405 affected by an offset and a line 614 indicating the position of the optical beam detection sensor 406 affected by an offset. The ratio is set to 1:1 in the present embodiment, and thus the line 612 is in the middle of the line 613 and the line 614.

A waveform 621 in FIG. 6B indicates a backward scanning target track defined by the track equation, $A1 \times SIN(\omega t + \Phi 1) - A2 \times SIN(2\omega t + \Phi 2)$. A waveform 622 indicates a second harmonic component of the backward scanning target track, which has a reversed phase with respect to the second harmonic component of the forward scanning target track. Note that the track equation of the backward scanning target track may be calculated by setting a value "$-A2$" in the register 220, or by advancing $\phi 2$ in the track equation of the forward scanning by 180°. A waveform 623 indicates a control track of backward scanning affected by an offset, and indicates a control error waveform in backward scanning when there is an offset. A waveform 624 indicates a second harmonic affected by an offset of the backward scanning, and indicates a second harmonic component in the control error waveform in backward scanning. The direction of the phase deviation in the second harmonic caused by an offset in backward scanning is opposite to the direction of the phase deviation in forward scanning. Although described in detail later, by measuring a difference value between the phase deviations in the second harmonic in forward scanning and backward scanning, an offset amount can be obtained.

With the control system shown in FIG. 1, offset compensation amounts for target beam phases are obtained based on the results of the offset detection. Compensated forward scanning target beam phases (P10'; P20'; P30'; P40') are obtained by shifting the forward scanning target beam phases 107 (P10; P20; P30; P40). Based on these compensated forward scanning target beam phases (P10'; P20'; P30'; P40'), control is performed such that in beam detection at the position 613 of the sensor 405 and the position 614 of the sensor 406, which are affected by an offset, an error with respect to the forward scanning target track 601 is close to zero. As a result of this control, target track correction is performed. Note that in the present embodiment, although two tracks that respectively include as their components two second harmonics having mutually reversed phases are used for measuring an offset, the combination is not limited to these two tracks. For example, a variation value in the phase of the second harmonic when scanning with a second harmonic may be obtained, and the offset compensation amount may be obtained more precisely, although this operation requires a longer period of time.

(Example of Characteristics of Conversion Matrixes 111 and 112)

Figure 7A:
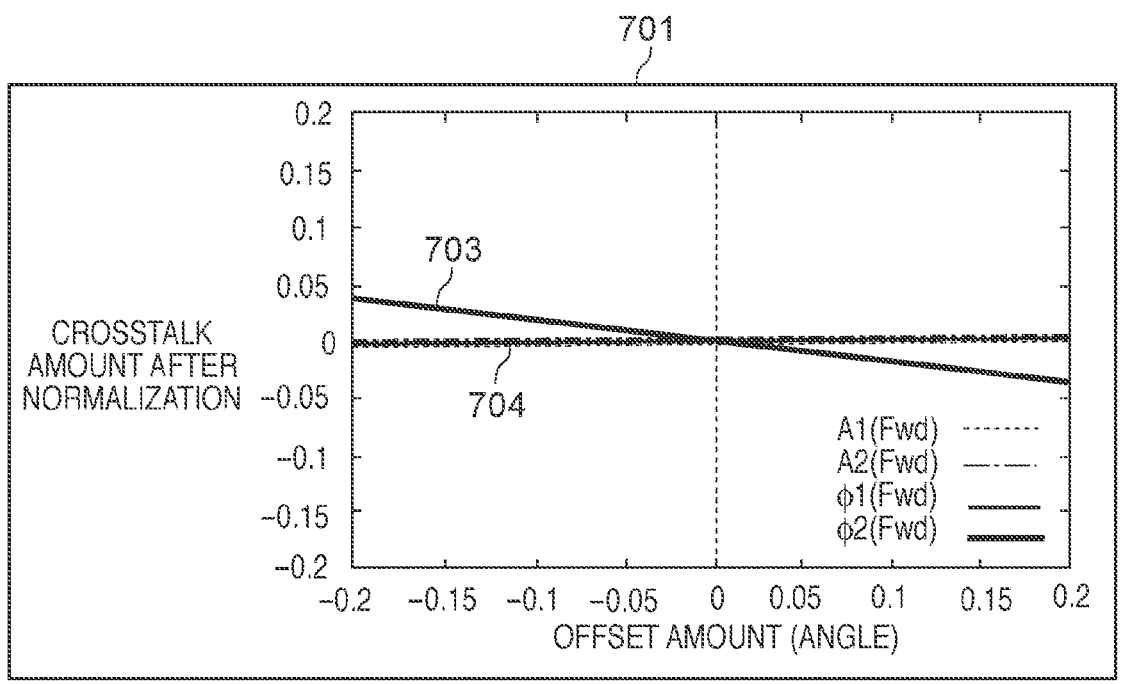
FIGS. 7A and 7B are diagrams each illustrating characteristics of a conversion matrix.
Figure 7B:
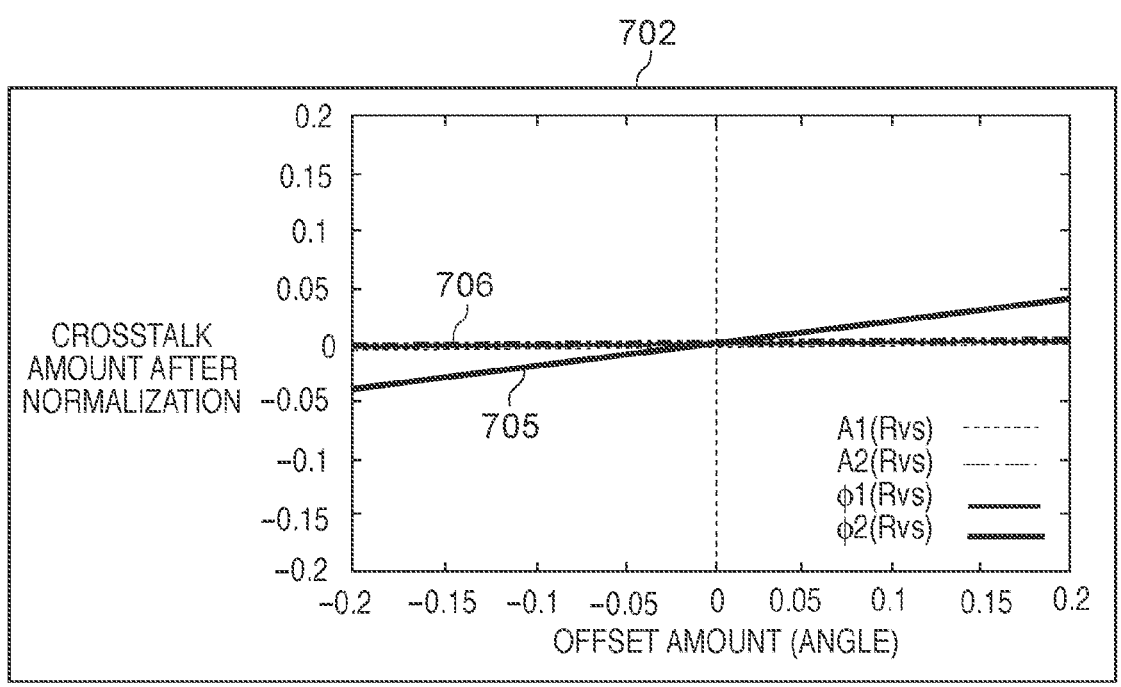

FIGS. 7A and 7B illustrate characteristics of the forward direction conversion matrix $M^{-1}\_Fwd$ 111 and the backward direction conversion matrix $M^{-1}\_Rev$ 112 shown in FIG. 1. The offset amount is plotted in the X axis centered on "0", and the crosstalk amount of the control parameters is plotted in the Y axis centered on "0". Note that normalization is performed for the Y axis by setting 90° to "1" ((crosstalk)amount)/90°. The crosstalk amount with respect to the offset control parameter in a set track will be described. Reference numeral 701 in FIG. 7A indicates crosstalk characteristics of the conversion matrix in forward direction, and reference numeral 702 in FIG. 7B indicates crosstalk characteristics of the conversion matrix in backward direction. Note that the crosstalk characteristics here refer to characteristics that vary according to a change in the offset amount. The crosstalk characteristics also refer to a deviation caused by an offset from an ideal scanning track, when the resonant type deflection apparatus shown in FIG. 3 is driven in a stable condition by inputting the scanning track indicated by Equation (1). With this, a crosstalk amount to the output of an offset item is calculated by using the set track as a parameter, the cross talk amount being caused by converting, with a four-input conversion matrix (the same as the beam phase conversion matrix 120) that is not full rank, the four inputs into control parameters. Note that the full rank here refers to a condition in which when simultaneous equations are expressed by a matrix, a mathematical representation is obtained in which the rank of the matrix is equal to the order (the number of unknowns) of the simultaneous equations. In short, the number of unknowns and the number of equations are equal, and thus a unique solution is obtained. On the other hand, a condition in which a matrix is not full rank indicates that as a result of the offset being not zero but becoming a new unknown, a new degree of freedom is given to the outputs that should be uniquely determined with the conversion matrix. This newly created degree of freedom changes any of the outputs, but the output and extent of such a change depend on the nature of the function of Equation (4). Since the track equation is a non-linear equation, an analytical solution cannot be obtained. For this reason, numerical solutions at the control operation points are obtained and shown in FIGS. 7A and 7B, and the fact that 100% of the offset value is reflected in $\Delta\phi 2$ is described as the crosstalk amount calculation results.

Reference numeral 703 indicates $\phi 2$ crosstalk characteristics ($\Delta\phi_d 2$) in forward scanning, and reference numeral 705 indicates $\phi 2$ crosstalk characteristics ($\Delta\phi_d 2$) in backward scanning. Reference numeral 704 indicates A1, A2, $\phi 1$ crosstalk characteristics ($\Delta A_d 1$, $\Delta A_d 2$, $\Delta\phi_d 1$) in forward scanning, and reference numeral 706 indicates A1, A2, $\phi 1$ crosstalk characteristics ($\Delta A_d 1$, $\Delta A_d 2$, $\Delta\phi_d 1$) in backward scanning. Note that $\Delta\phi_d 2$ here refers to the extent of actual phase deviation with respect to $\phi 2$ that relates to an ideal offset. $\Delta A_d 1$, $\Delta A_d 2$, and $\Delta\phi_d 1$ crosstalk characteristics are "0" at the origin and substantially "0" around the origin, regardless of the set tracks. In contrast, it is understood that $\Delta\phi_d 2$ crosstalk characteristics show that the crosstalk amount varies in opposite inclinations depending on set tracks. This proves that the offset serves as a phase deviation component of the control waveform in terms of calculation, based on the characteristics of the function described earlier.

<Procedure of Offset Compensation Control of Present Embodiment>

Figure 8:
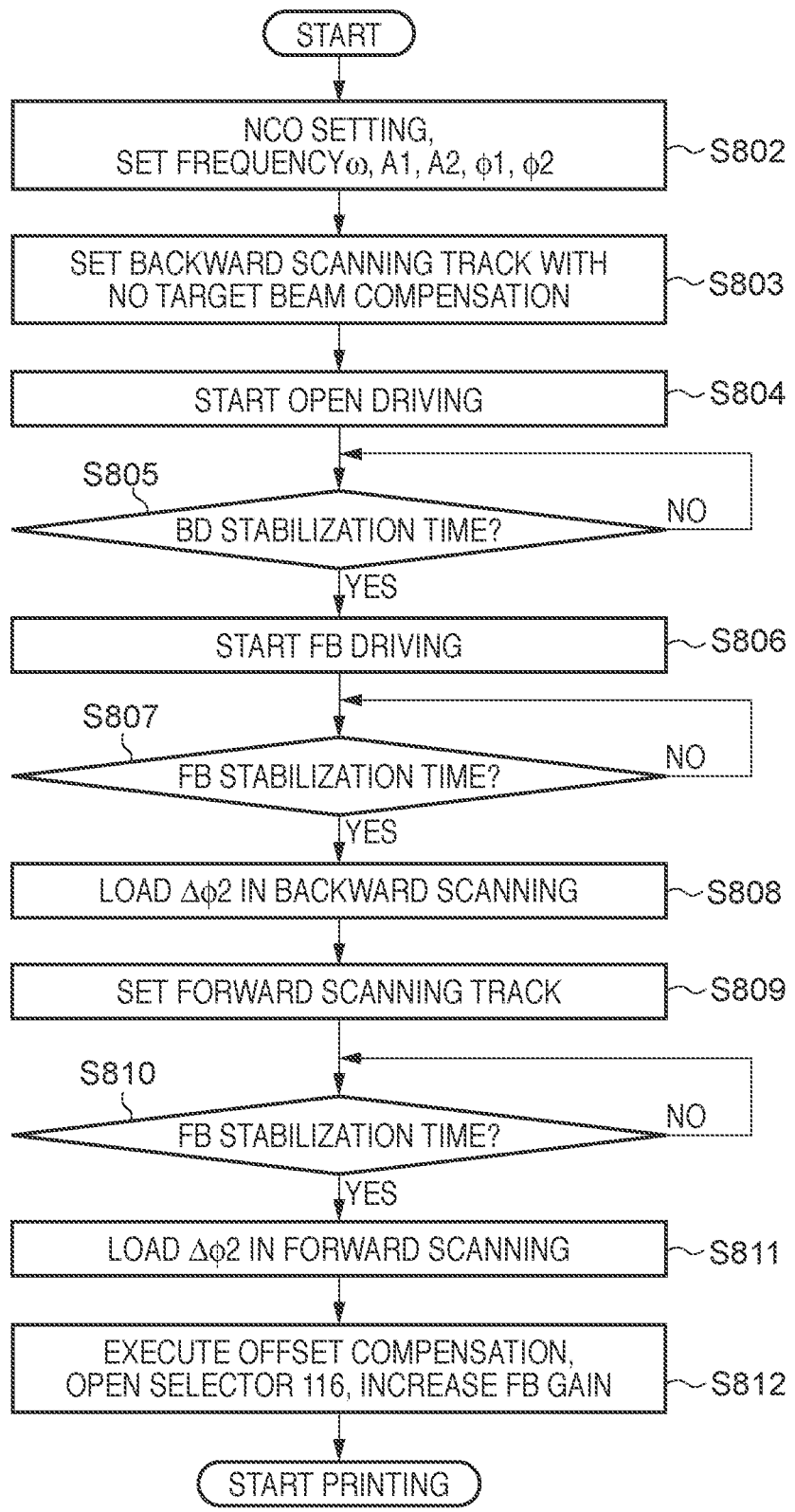
FIG. 8 is a flowchart of a control procedure performed by a CPU of the embodiment.
Figure 9:
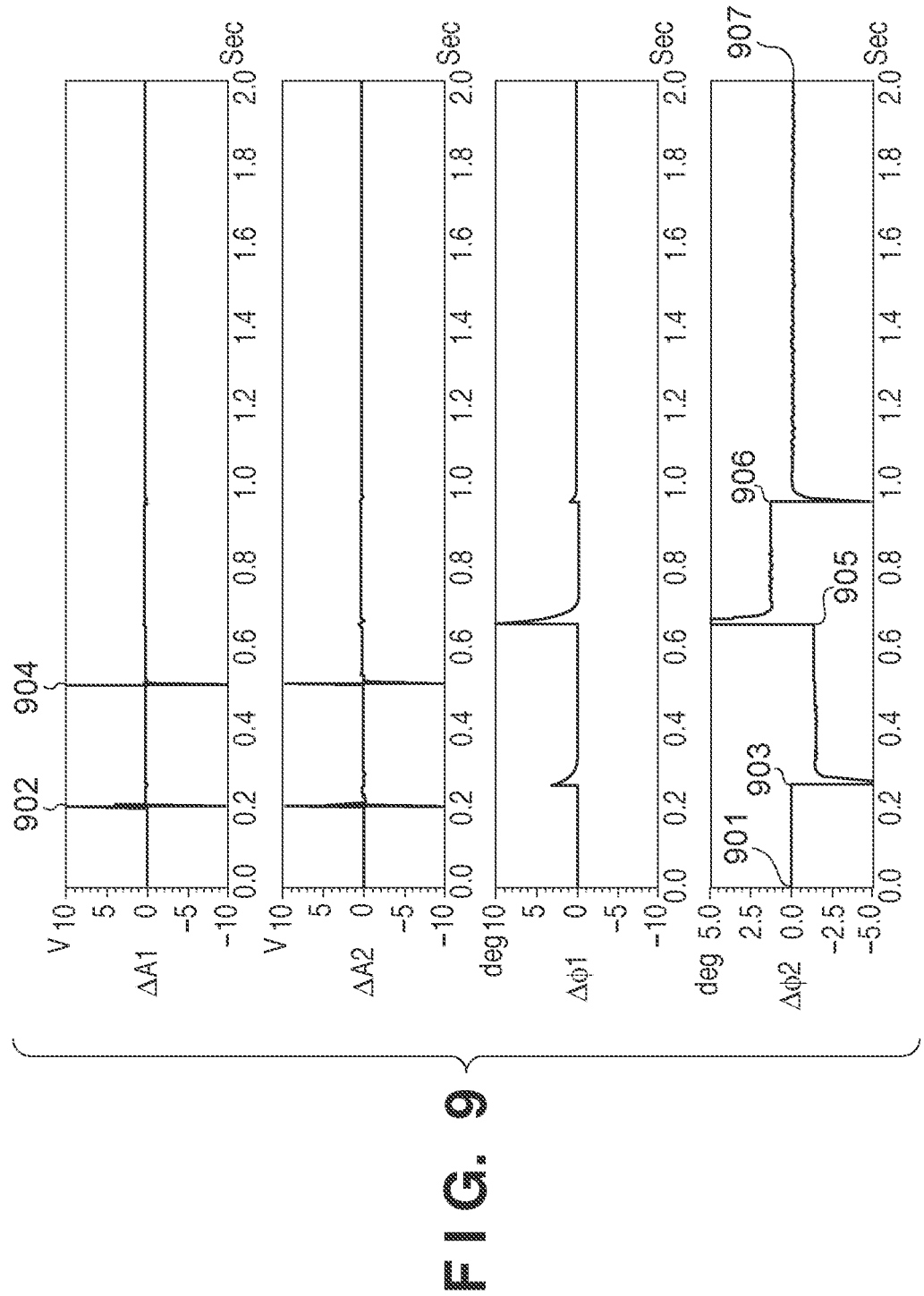
FIG. 9 is a timing chart illustrating an offset compensation operation in a control system of the optical scanning apparatus of the embodiment.
Figure 10:
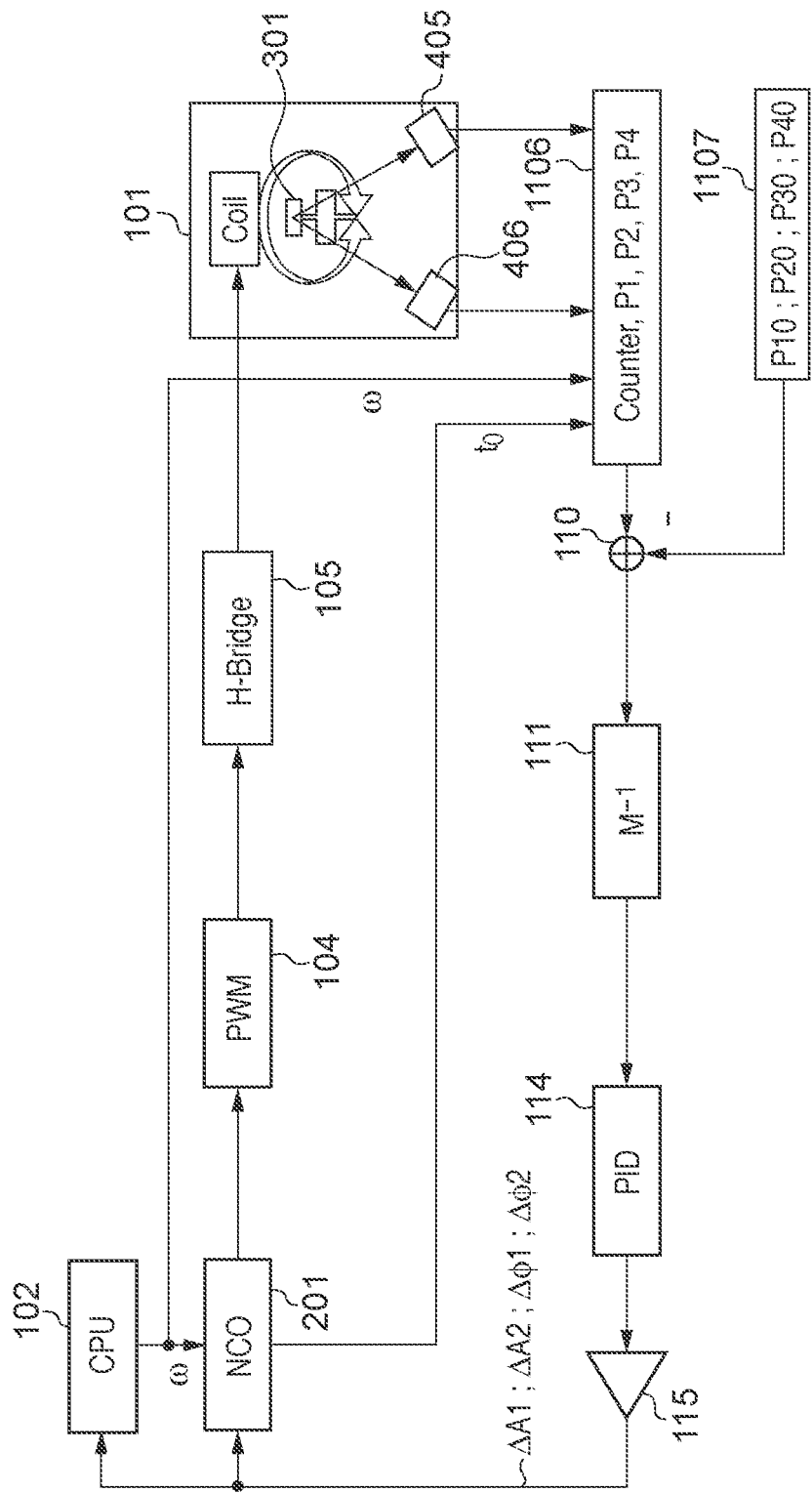
FIG. 10 is a block diagram showing the configuration of a track control system of a conventional optical scanning apparatus.
Figure 11:
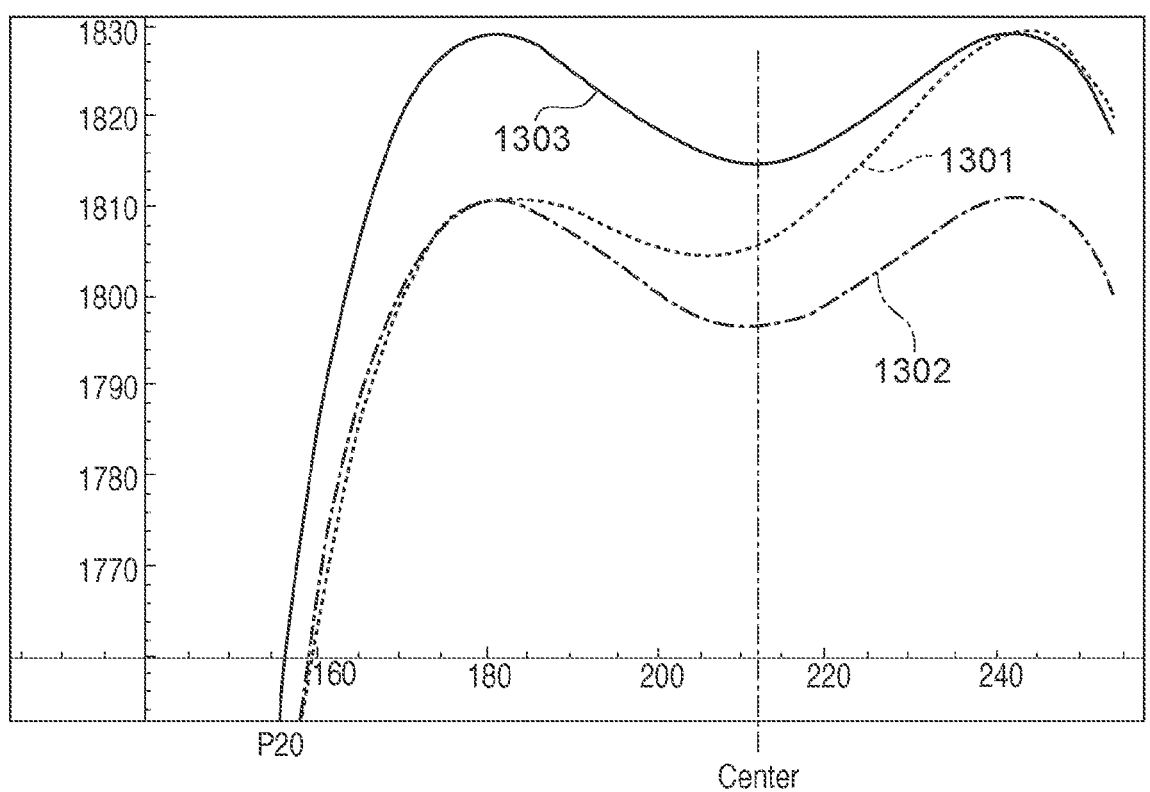
FIG. 11 is a diagram showing an effect of a conventional offset track velocity error.

FIG. 8 is a flowchart illustrating a control procedure for offset compensation according to an instruction issued by the CPU 102. Also, FIG. 9 is a timing chart illustrating an offset compensation operation in the control system according to the control procedure shown in FIG. 8. This timing chart was created by performing model calculation on temporal responses in relation to the control parameters $\Delta A1$, $\Delta A2$, $\Delta\Phi 1$ and $\Delta\Phi 2$. When the CPU 102 receives a scanner start-up signal for the start of printing, it reads out a driving frequency and initial values of A1, A2, $\Phi 1$ and $\Phi 2$ from a predetermined register, and sets these values in corresponding registers of the NCO 103 described in FIG. 2 (step S802 in FIGS. 8, and 901 in FIG. 9).

Next, the target beam compensation amount is set to 0 vector with the selector 122, and the backward scanning track is set as a target value (step S803), and open driving is started according to the initial values (step S804, 901). When the amplitude has grown and a BD incidence stabilization time is reached (step S805), the gain of the feedback gain unit 115 is set, the amplitude and phase control loop is closed in order (selectors 109, 113 and 116 are sequentially set to backward scanning; amplitude 902 and phase 903), thereby starting feedback driving (step S806). When the feedback stabilization time is reached (step S807), the value of $\Delta\Phi 2$ in backward scanning is loaded to the backward scanning phase register 118, and a phase fluctuation range in backward scanning is obtained (step S808; 904). The phase control loop is opened and the forward scanning track is set (set the selector 116 to open, and set the selectors 109 and 113 to forward scanning; 904) and the phase control loop is closed, thereby starting forward scanning track feedback driving (set the selector 116 to forward scanning (step S809; 905)). In step S809, a sequence control procedure is performed in which the control track is set to backward scanning first and then set to forward, and while the phase of the fundamental frequency is stored (substantially fixed), track switching in which the phase of the second harmonic (phase of harmonic) is switched by 180° is performed. By this method, transition to offset measuring processing and offset compensation processing is achieved without stopping oscillation, thereby finishing start-up operation in a short period of time. Note that it is sufficient if the phase of the fundamental frequency and the phase of the second harmonic thereof vary relative to each other, and it is possible to perform track switching in which the phase of the fundamental frequency is switched by 180° while storing (substantially fixing) the phase of the second harmonic. When a feedback stabilization time is reached (step S810), the value $\Delta\Phi 2$ in forward scanning is loaded to the forward scanning phase register 117, and the phase fluctuation range in forward scanning is obtained (step S811). Then, the selector 122 is switched such that the target beam compensation amount is changed from 0 vector to an offset value based on the difference value between the values in the forward scanning phase register 117 and the backward scanning phase register 118. Offset compensation control is performed as a feedback loop for feeding back this offset value. Also, the selector 116 is kept open until next execution of the flowchart of FIG. 8 is started. Alternatively, it is also possible that without opening the selector 116, the gain adjuster 130 does not perform loading to the forward scanning phase register 117 ($\Delta\phi 2\_Fwd$) and the backward scanning phase register 117 ($\Delta\phi 2\_Rev$) until next execution of the flowchart of FIG. 8 is started.

Then, the feedback gain for the track control in offset compensation processing is controlled so as to be higher than the feedback gain for offset detection (by the feedback gain 115 and/or the PID 114) (step S812; 906). In this manner, stability in the track control is secured when an offset is detected in an unstable state due to an offset error. At the same time, convergence accuracy is increased in offset compensation processing whose stability is increased due to offset compensation, and jitter caused by disturbed air is suppressed with a high gain, thereby achieving an effect of obtaining high-quality images. Also, with respect to the target track in the offset compensation processing, successive sequence control is performed in which correction is made by setting a target track that is obtained by superposing an offset compensation amount on the target track obtained in the last offset detection. In this manner, transition to offset compensation processing is possible without stopping oscillation, which achieves an effect of reducing start-up time.

(Detailed Description of Step S812)

The relation between $\Delta\phi2$ and $\Delta\phi_d2$ that are respectively input to the forward scanning phase register 117 and the backward scanning phase register 118 in FIG. 1 is described below. This provides a detailed description of the gain adjuster 130 shown in FIG. 1. In the track feedback control loop, $\Delta\phi2$ that is obtained when a resonant type deflection apparatus is driven in a stable state includes $\Delta\phi_d2$ described earlier and $\Delta\phi_o2$ due to other factors. For example, $\Delta\phi_o2$ includes a phase variation caused by other factors related to the system such as delay characteristics of driving or other systems, or load fluctuation due to variation in atmosphere pressure. The suffix of $\Delta\phi_o2$, which is "o", is the first letter of "other". Here, $\Delta\phi f2$ and $\Delta\phi r2$ that are respectively held by the forward scanning phase register 117 and the backward scanning phase register 118 in FIG. 1 can be expressed with the following Equation (5) and Equation (6), respectively. Note that $\Delta\phi f2$ indicates $\Delta\phi2$ of forward scanning, and $\Delta\phi r2$ indicates $\Delta\phi2$ of backward scanning. Note that $\Delta\phi_o2$ is the same in both the forward scanning and the backward scanning, because the amplitude in the forward scanning and the backward scanning is the same since the resonant type deflection apparatus is torsionally symmetric, and delay characteristics of the system or load variation due to atmosphere pressure variation in a short period of time are the same.

$$\Delta\phi f2 = \Delta\phi_o2 + \Delta\phi_d2 \quad \text{Equation (5)}$$

$$\Delta\phi r2 = \Delta\phi_o2 - \Delta\phi_d2 \quad \text{Equation (6)}$$

Accordingly, by subtracting $\Delta\phi r2$ from $\Delta\phi f2$ in the comparator 119 shown in FIG. 1, a double of $\Delta\phi_d2$ ($2\Delta\phi_d2$) can be extracted. Then, the gain adjuster 130 adds system gain and the like (PID 114 and the like) to the double of $\Delta\phi_d2$ ($2\Delta\phi_d2$) that has been extracted, and multiplies the result by a predetermined coefficient such that the gain is "1" with respect to the output of the forward scanning conversion matrix $M^{-1}\_Fwd$ 111 and the backward scanning conversion matrix $M^{-1}\_Rev$ 112. Note that in place of the gain adjuster 130, an average multiplier may be provided. However, in this case, it is necessary to not apply the system gain (PID 114 or the like) to $\Delta\phi2$ that is input to the feedback portion in the offset compensation control loop. That is, the output from the selector 113 can be directly input to the selector 116. It is understood that as a result of such control, an offset value 907 of $\Delta\Phi2$ after offset compensation is converged to substantially zero. Note that $\Delta\phi2$ in FIG. 9 does not include $\Delta\phi_c2$ described above, and the flowchart of FIG. 8 shows that at the least, the offset due to $\Delta\phi_d2$ is reduced to substantially zero. As a result, it is possible to suppress a phenomenon in which the track is distorted when track control is performed in a state where there is an offset.

<Effect>

In the above description, requirement for mechanical accuracy, which is important for increasing control accuracy, can be achieved with an automatic detection unit and an electronic correction unit, even if a beam detection system involves is not a high accuracy, and thus an effect of realizing highly accurate track control with an inexpensive configuration is achieved. In reality, it is practically impossible to control the beam detection position to a level of approximately $\frac{1}{60}°$ in commercial products such as image forming apparatuses, and thus the above-described mechanism is very useful for realizing a resonant type scanner at a low cost.

<Other Embodiments>

In the description of the flowchart in FIG. 8, while an image forming apparatus is executing printing, the selector 116 is opened and the output from the beam phase conversion matrix 120 is fixed. However, another system configuration may be adopted. For example, the offset compensation amount calculated according to the processing in step S812 of FIG. 8 may be separately stored, and during printing, a signal obtained by reversing the stored offset compensation amount may be input to the comparator 110. Alternatively, a target phase obtained by subtracting an offset compensation amount from the forward scanning target beam phase 107 may be separately stored, and the stored target phase may be used when printing is performed.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-143918, filed on Jun. 24, 2010, which is hereby incorporated by reference herein in its entirety.

What is claimed is:

1. An optical scanning apparatus comprising:
an optical scanning unit including a swing mirror deflecting an optical beam and driving unit, the swing mirror being supported by a torsional vibration system having a first natural frequency and a second natural frequency that is a double of the first natural frequency, and the driving unit being configured to apply a swing torque having the first natural frequency and the second natural frequency to the torsional vibration system;
an optical beam detection unit configured to detect passage of an optical beam deflected by the swing mirror at two locations in a non-image region, and output track information indicating a track of the swing mirror;
a track control unit configured to, based on a difference between the track indicated by the track information detected by the optical beam detection unit and a predetermined target track, adjust the swing torque such that the track of the swing mirror approaches the target track, thereby performing feedback control;
a calculation unit configured to sequentially switch target tracks of scanning in a forward direction and a backward direction, the phases of the second natural frequency of the target tracks being mutually reversed, perform the feedback control by the track control unit for each scanning in the forward direction and the backward direction, and calculate an amount of offset compensation based on the difference between the predetermined target track and the track detected by the optical beam detection unit for each scanning in the forward direction and the backward direction; and
an offset compensation unit configured to reflect the amount of offset compensation in the feedback control.

2. The optical scanning apparatus according claim 1, wherein the amount of offset compensation is for changing the target track.

3. The optical scanning apparatus according claim 1, wherein the difference between the predetermined target track and the track detected by the optical beam detection unit for each scanning in the forward direction and the backward direction is information on a phase of a track of the second natural frequency.

4. The optical scanning apparatus according claim 1, wherein the track control unit is further configured to, after obtaining the difference from the predetermined target track by performing track control based on the target track for the scanning in the backward direction, reverse a phase of the second natural frequency in a driving cycle with respect to a phase of the first natural frequency in the driving cycle.

5. The optical scanning apparatus according claim 1, wherein the track information detected by the optical beam detection unit includes phase information of the track,
- the calculation unit is configured to shift phase information of the target track,
- the optical scanning apparatus includes a storage unit for storing a target track obtained by shifting the phase information, and
- the track control unit is configured to perform track control according to the target track stored in the storage unit.

6. The optical scanning apparatus according claim 1, wherein a feedback gain for the track control by the track control unit is set higher than a feedback gain for calculation of the amount of offset compensation by the calculation unit.

7. An image forming apparatus comprising the optical scanning apparatus according to claim 1 as an exposure unit.

* * * * *